US012162500B1

United States Patent
Egbert et al.

(10) Patent No.: US 12,162,500 B1
(45) Date of Patent: Dec. 10, 2024

(54) VEHICLE REPRESENTATION DETERMINATION

(71) Applicant: Zoox, Inc., Foster City, CA (US)

(72) Inventors: Joshua Dean Egbert, Redwood City, CA (US); Joseph Funke, Redwood City, CA (US); Xianan Huang, Foster City, CA (US); Dhanushka Nirmevan Kularatne, Fremont, CA (US); David Evan Zlotnik, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 365 days.

(21) Appl. No.: 17/829,114

(22) Filed: May 31, 2022

(51) Int. Cl.
  *B60W 50/00*   (2006.01)
  *B60W 50/02*   (2012.01)
  *B60W 60/00*   (2020.01)

(52) U.S. Cl.
  CPC .... *B60W 50/0097* (2013.01); *B60W 50/0205* (2013.01); *B60W 60/0027* (2020.02); *B60W 2520/06* (2013.01); *B60W 2556/10* (2020.02)

(58) Field of Classification Search
  CPC ......... B60W 50/0097; B60W 60/0027; B60W 50/0205; B60W 2556/10; B60W 2520/06
  See application file for complete search history.

(56) References Cited

U.S. PATENT DOCUMENTS

| | | | | |
|---|---|---|---|---|
| 2020/0406969 A1* | 12/2020 | Ersal | .................. | B60W 10/184 |
| 2021/0163068 A1* | 6/2021 | Zhu | .................... | B62D 15/0285 |
| 2021/0286366 A1* | 9/2021 | Inoue | .................. | G05D 1/0276 |
| 2022/0144308 A1* | 5/2022 | Takhmar | .......... | B60W 30/0956 |
| 2022/0227367 A1* | 7/2022 | Kario | .............. | B60W 30/0956 |
| 2022/0371583 A1* | 11/2022 | Kario | .................... | B60W 40/12 |
| 2022/0397402 A1* | 12/2022 | Bolless | .............. | G01C 21/3841 |
| 2022/0397906 A1* | 12/2022 | Sneyders | ............. | A01B 69/008 |
| 2023/0030104 A1* | 2/2023 | Puchkarev | ........ | B60W 60/0027 |
| 2023/0195122 A1* | 6/2023 | Shenfeld | .............. | G06V 20/588 |
| | | | | 701/26 |
| 2023/0229163 A1* | 7/2023 | Rust | ..................... | G05D 1/0088 |
| | | | | 701/50 |
| 2023/0356774 A1* | 11/2023 | Zhang | .................. | B62D 15/025 |

* cited by examiner

*Primary Examiner* — Jaime Figueroa
*Assistant Examiner* — Zachary Joseph Wallace
(74) *Attorney, Agent, or Firm* — Lee & Hayes, P.C.

(57) ABSTRACT

Techniques for accurately predicting vehicle state errors for avoiding collisions with objects detected in an environment of a vehicle are discussed herein. A vehicle safety system can implement a model determine a representation of the vehicle usable in a scenario. The model may dynamically determine a size and/or a heading of the vehicle representation based on differences between a candidate trajectory and a current trajectory of the vehicle. The safety system can identify a potential collision between the vehicle and the object based at least in part on an overlap of the vehicle representation and an object representation.

20 Claims, 6 Drawing Sheets

VEHICLE REPRESENTATION DETERMINATION

BACKGROUND

Planning systems in autonomous and semi-autonomous vehicles determine actions for a vehicle to take in an environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle. However, determining the potential action for the vehicle depends upon accurately predicting behaviors of the vehicle and the objects, as may be performed in a simulation or other propagation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
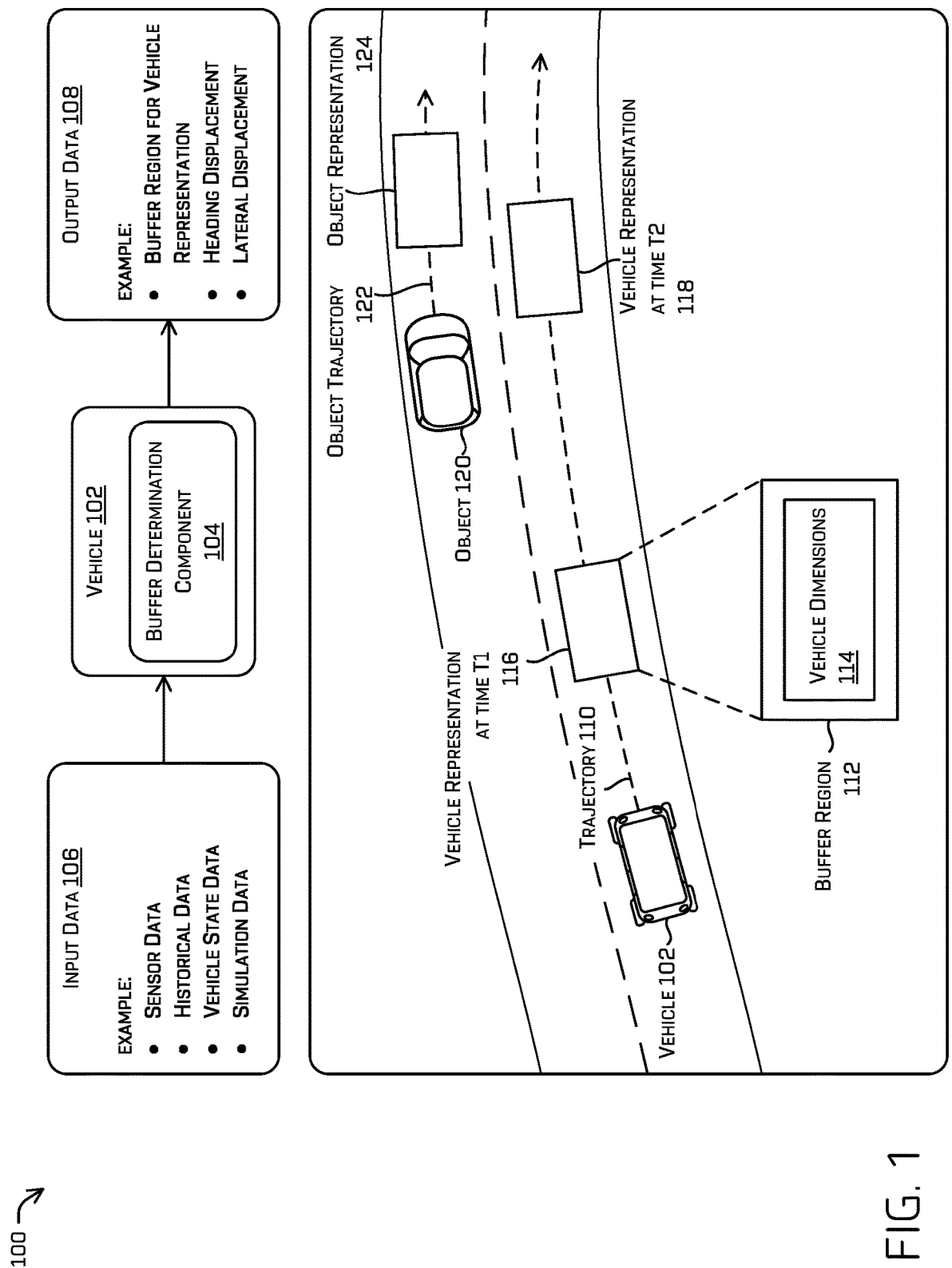
FIG. 1 is an illustration of an example environment, in which an example vehicle applies a model to determine a vehicle representation usable for predicting a likelihood of an intersection with one or more example objects.

This disclosure relates to techniques for accurately predicting vehicle state errors for avoiding collisions with objects detected in an environment of a vehicle. The vehicle may be an autonomous vehicle including one or more sensors to detect objects in the environment. The techniques can include a vehicle safety system that implements a model to determine a representation of the vehicle usable in a scenario. In some examples, the model may dynamically determine a size and/or a heading of the vehicle representation based on differences between an expected position and/or heading of the vehicle and a current position and/or heading of the vehicle. For example, the model can determine a position error (e.g., a lateral error) and/or a heading error of the vehicle along a trajectory at various times during the scenario. The safety system can identify a potential collision between the vehicle and the object based at least in part on an overlap of the vehicle representation and an object representation. By implementing the model, more accurate vehicle representations can be determined (e.g., ones which incorporate potential sources of error), thereby improving the overall safety of the vehicle by determining whether the representation associated with the vehicle overlaps with a representation associated with an object.

In some examples, the model of the vehicle safety system can determine a buffer region for adding to dimensions of the vehicle to represent the vehicle in a scenario (e.g., a simulation). The buffer region can represent an area in addition to the vehicle dimensions to provide a measure of safety for how the vehicle may perform in a real-world environment. In various examples, the model can dynamically adjust the buffer region over time (e.g., change a size, heading, etc. of the representation as the vehicle navigates in an environment) to enable the vehicle to "react" to changing environmental conditions. The buffer region can be thought of as a region around the vehicle dimensions (e.g., height, width, length) which, when combined with the vehicle dimensions makes up the vehicle representation. In this way, predictions by the vehicle can be improved relative to not implementing the model (e.g., the vehicle can determine whether to take an action such as stopping or proceeding relative to one or more objects).

In various examples, to determine the buffer region, the model can receive a variety of input data for processing. For instance, the model can receive historical data indicating one or more positions, orientations, etc. associated with a vehicle along a trajectory at a previous time, and also receive sensor data, vehicle state data, etc. indicating a position and/or orientation (e.g., roll, pitch, yaw) of the vehicle at a current time. The model can, for example, be configured to determine differences between a lateral distance and/or heading from a trajectory based on the historical data, the sensor data, the vehicle state data, etc. In some examples, the historical data can represent a maximum lateral error and/or heading error observed as the vehicle navigates in the environment (e.g., a real-world environment and/or a simulated environment). In other words, the model can determine changes in a lateral distance and/or a heading between a predicted trajectory, a past trajectory, and/or a current trajectory, and adjust or otherwise determine the buffer region over time based at least in part on the changes. Input data usable to determine the buffer region and subsequent vehicle representation can, in some examples, include historical or current steering data (e.g., a steering rate, a steering angle, etc.), a distance along a trajectory (e.g., an arc length), and so on. In some examples, the model can determine changes in a lateral distance and/or a heading at different times, and combine or aggregate the lateral distances and/or headings using statistics, or other techniques. In some examples, the model can determine the buffer region based at least in part on the changes in the lateral distances and/or headings over time (e.g., an average, a maximum, etc.)

In some examples, the historical data can represent error information and can include data associated with one or more of: a lateral error, a heading error, a change in lateral errors and/or heading errors at different times, a maximum lateral error over a time period, a maximum heading error over a time period, a distance of the vehicle along a predicted trajectory, etc. The historical data can, for instance, represent log data associated with the vehicle as it navigates an environment and/or observed errors from previous times (also referred to as observed tracking errors).

As mentioned, the vehicle representation can change over time as the model dynamically determines the buffer region thereby accounting for deviations from a predicted trajectory, a current trajectory, and so on. Deviations between a predicted trajectory and a current trajectory can occur, for example, based at least in part on errors associated with signals, controls, detections, and so on, that propagate and combine. For example, the model can scale an error is a position or heading of the vehicle based on a distance along the predicted trajectory. The model can, for instance, scale the error so it approaches a maximum expected error over time (e.g., the error is smaller when an object is near the vehicle in the simulation and approaches the maximum error for an object further from the vehicle). Conventional techniques can rely on a standard or fixed buffer surrounding a vehicle which may cause a vehicle to predict that it is unable to overtake another object and therefore remain stationary in examples when the vehicle has enough space to proceed past the object (e.g., a static or dynamic object). In other words, such conventional techniques can be overly conservative or cautious and can thereby prevent or limit progress in an environment. The representation determination techniques described herein causes a vehicle representation to be constantly adjusted based on sensor data and historical data describing an environment as well as vehicle state data describing a state of the vehicle (e.g., a current acceleration, trajectory, steering rate, steering angle, yaw, etc.). Thus, implementing the techniques described herein can cause a model to generate a vehicle representation usable in a scenario that causes a vehicle to proceed past an object rather than remaining stationary due to the scenario using a vehicle representation that includes a buffer region that is more accurate than the buffer region determined from conventional techniques. Using the vehicle representation output by the model, the vehicle safety system can quickly verify that a planned trajectory of the vehicle will or will not result in an intersection (e.g., a collision) with an object, thereby improving safety of the vehicle.

Generally, the model implemented by the vehicle safety system can provide functionality to generate data representing scenarios or interactions between a vehicle and objects in an environment in the future. In some examples, the model can determine a vehicle representation with the buffer region and predict whether the vehicle representation and an object representation potentially overlap (e.g., intersect) at different times in the future. Based at least in part on the overlap, the vehicle safety system can cause the vehicle to take an action such as whether the vehicle should stop, brake, accelerate, steer, and/or otherwise modify vehicle behavior to avoid the intersection. The vehicle safety system may also or instead determine an intersection probability, intersection point, and/or intersection time between the object and the area of the vehicle at an intersection point in the future. In some examples, the vehicle safety system can send an indication of a potential intersection between the object and the vehicle to a vehicle computing device based at least in part on the intersection probability, the time, etc. thereby enabling the vehicle computing device to plan an action for the vehicle to avoid the object (e.g., control a steering action, a braking action, an acceleration action, and so on). For instance, the vehicle computing device can receive the intersection information from the vehicle safety system for use in planning operations, such as determining a candidate trajectory for the vehicle. In various examples, the vehicle may receive indications of potential intersection(s) with object(s) usable by the vehicle to quickly and/or preemptively avoid objects, thereby improving safety of the vehicle.

In various examples, the vehicle safety system can initiate scenarios by a model that receives data associated with vehicle representations at different times, object information data (a speed of the object, an acceleration of the object, a yaw of the object, etc.), and/or vehicle information data (e.g., a speed of the vehicle, a trajectory of the vehicle, steering information, etc.). The model may also or instead determine a time to initiate an action (e.g., a braking action to cause the vehicle to brake, a steering action to cause the vehicle to steer, or an acceleration action to cause the vehicle to accelerate) by the vehicle relative to the intersection point.

The scenarios generated by the model can represent potential interactions between one or more objects and the vehicle. In various examples, the model can determine potential interactions based at least in part on receiving top-down multi-channel data indicative of a top-down representation of an environment. In such representations, multiple two-dimensional data representations may be combined wherein each channel or layer comprises differing data about the environment as viewed from a "top-down" perspective. The top-down representation may be determined based at least in part on map data (which may include lane demarcations, speed limits, traffic control device indications) and/or sensor data captured from or associated with a sensor of an autonomous vehicle in the environment and/or derivative data therefrom (detections, classifications, etc.), and may represent a top-down view of the environment to capture context of the autonomous vehicle (e.g., identify actions of other objects such as vehicles and pedestrians relative to the vehicle).

In some examples, the vehicle may comprise an autonomous or semi-autonomous vehicle (e.g., one in which certain aspects of the vehicle may be controlled by a computing device in conjunction with manual input) with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict a vehicle representation including a buffer region and/or an intersection probability associated with the object.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device. Additional examples of a vehicle architecture comprising a primary computing system and a secondary computing system can be found, for example, in U.S. patent application Ser. No. 16/218,182 titled "Collision Avoidance System with Trajectory Validation" filed Dec. 12, 2018, U.S. patent application Ser. No. 16/232,863 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference in their entirety.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives input data (e.g., perception data) based on the sensor data and AI techniques implemented by the primary system (e.g., vehicle computing device), and may perform various techniques described herein for improving collision prediction and avoidance by a vehicle. By way of example and not limitation, to enable the vehicle to respond quickly and accurately to objects, the model may send intersection information (e.g., intersection data) to a planning component configured to plan or otherwise determine a trajectory for the vehicle and/or to a perception component configured to sense the environment. In this way, intersection information from the model can be considered during planning operations (e.g., to avoid the object) and/or during perception operations (e.g., to direct one or more sensors to capture a different level of perception for an object).

A vehicle computing device may allocate an amount of memory, a type of memory, and/or a memory location to make the best use of available memory resources to models that predict possible intersections between object(s) and the vehicle. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to predict vehicle presentations and/or intersection probabilities. A vehicle computing device that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing the vehicle representation and the object representation using a GPU, CPU, or a combination thereof. In this way, the model may be defined to utilize the processing resources that enable the model to perform predictions in the least amount of time (e.g., to use the intersection values in planning considerations of the vehicle). Accordingly, a model may make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally, or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may act as an attention system (e.g., a vehicle safety system and/or a redundancy to an existing perception component) that determines accurate vehicle representations that improves predictions associated with the vehicle. In some examples, the model improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing intersection data by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example prediction model (buffer determination component 104) may receive input data 106 and determine output data 108. In some examples, the output data 108 can represent a vehicle representation with a buffer region that is usable in a scenario to determine a potential intersection between the vehicle 102 and one or more objects in the environment 100. A vehicle computing device (e.g., vehicle computing device 404) and/or a vehicle safety system (e.g., vehicle safety system 434) may implement the buffer determination model 104 of the vehicle 102. While described as a separate system, in some examples, buffer determination techniques described herein may be implemented by other vehicle systems, components, and/or computing devices. For example, and as will be described in further detail with regard to FIG. 4, the buffer determination techniques described herein may be implemented at least partially by or in association with a localization component 420, a perception component 422, and/or a planning component 424.

In some examples, the vehicle 102 may comprise an autonomous or semi-autonomous vehicle with a vehicle computing device configured to receive sensor data from one or more sensors of the vehicle. The vehicle 102 may detect object(s) using one or more sensors while navigating in the environment 100. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle 102. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine the input data 106 usable by a model to predict an edge of the object and/or semantic information associated with the object (e.g., an identification, an object type, an object shape, etc.).

In some examples, the input data 106 can comprise one or more of: sensor data, historical data (e.g., of any one or more objects and associated state data, of the vehicle states, of the vehicle trajectories, of the environment, etc.), vehicle state data, object state data, simulation data, map data, and/or environmental data. For instance, the buffer determination component 104 can receive the input data 106 (e.g., a trajectory 110 of the vehicle, vehicle state data, historical data, etc.) and generate the output data 108 representing a buffer region 112 for the vehicle 102. For instance, the buffer region 112 can be determined based at least in part on differences between positions, heading, steering information, etc. of a current trajectory and the predicted trajectory 110 (also referred to as a reference trajectory) of the vehicle. In such an example, the buffer region 112 may enable the system to consider various errors introduced from sensor data acquisition to final control of the vehicle. The buffer region 112 can be, for example, an area surrounding vehicle dimensions 114 of the vehicle 102 and can include a variety of shapes and sizes (e.g., the shape can be irregular and account for different headings of the vehicle 102 over time). In some examples, the buffer region 112 can be added to the vehicle dimensions 114 to generate a representation of the vehicle 102 usable in a scenario (e.g., a simulation to determine whether the vehicle representation and an object representation overlap). For example, the buffer determination component 104 can generate the output data 108 comprising a vehicle representation at time T1 116 and a vehicle representation at time T2 118 (and optionally vehicle representations up to time TN).

In some examples, the vehicle safety system can be configured to detect an object in the environment 100, such as object 120 (e.g., a vehicle). In some examples, the vehicle safety system may be configured to receive, detect, infer, estimate, or otherwise determine one or more paths for each detected object. As shown in FIG. 1, the object 120 is associated with an object trajectory 122 determined by the vehicle safety system (e.g., using another model). In some examples, the buffer determination component 104 may receive path information and/or probabilities associated with the object trajectory 122 from a machine learned model. The object 120 can be associated with an object representation 124 to represent the object at different times in the future.

In some examples, a same or different model of the vehicle safety system can determine whether a potential intersection between the vehicle 102 and the object 120 occurs in the environment 100 in the future. For instance, the vehicle safety system can determine whether an overlap occurs between at least one of the vehicle representation at time T1 116 or the vehicle representation at time T2 118, and the object representation 124, and output an indication of the potential intersection based at least in part on the overlap. By outputting vehicle representations having different buffer regions for different times in the future using the techniques described herein, determinations of potential intersection(s) can be more accurate (versus not implementing the buffer determination model 104 and/or relying on a fixed buffer) thereby improving vehicle safety of the vehicle 102 as it navigates in the environment 100.

In various examples, the vehicle computing device (or vehicle safety system) associated with the buffer determination component 104 may be configured to receive sensor data representing the environment 100, such as via a perception component (e.g., the perception component 422). In some examples, the sensor(s) may include sensors mounted on the vehicle 102, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100. Additional details of using to-down representations are described in U.S. patent application Ser. No. 16/504,147, filed on Jul. 5, 2019, entitled "Prediction on Top-Down Scenes Based On Action Data," and in U.S. patent application Ser. No. 16/151,607, filed on Oct. 4, 2018, entitled "Trajectory Prediction on Top-Down Scenes," which are incorporated herein by reference in their entirety and for all purposes. Additional examples of selecting bounding boxes can be found in U.S. patent application Ser. No. 16/201,842, filed on Nov. 27, 2018, entitled "Bounding Box Selection," which is incorporated herein by reference in its entirety and for all purposes.

The buffer determination component 104 may, in some examples, receive historical data (log data) representing raw or processed sensor data associated with a previous time. In some examples, the historical data can be associated with the vehicle navigating in the environment 100 and/or a scenario at a previous time. The historical data can, for example, describe vehicle information (e.g., previous vehicle state data) of the vehicle 102.

In some examples, the buffer determination component 104 may receive input data representing object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, steering angle data, or steering rate data associated with the vehicle). As mentioned, the vehicle state data may be associated with a previous time (historical data), a current time, or a predicted time in the future.

In various examples, the buffer determination component 104 may receive map data representing static features of the environment 100 (which, in at least some examples, may also comprise designations for lane markings, lane speed, road control information—e.g., stop signs, traffic signals, crosswalks, school zones, speed bumps, and the like). The map data can be received from one or more components of a vehicle computing device or remote computing device (e.g., a computing device associated with an autonomous vehicle in a fleet of vehicles or other computing device remote from the vehicle 102.) The buffer determination component 104 may also or instead receive environmental data (e.g., weather conditions, elevation, and the like).

In some examples, the input data 106 can include two-dimensional representations and/or vector representations of the example environment 100. For example, as part of "pre-processing" the sensor data for use as input data, a model of a vehicle safety system may associate sensor data (or portions thereof) with two-dimensional representations to achieve a desired input data size for more efficient processing. The two-dimensional data representation (also referred to as a two-dimensional representation or a 2D space) may include a vector representation and/or a top-down representation of the environment 100. In such examples, data may be encoded into a multi-channel two-dimensional representation in which each channel comprises different data of the environment creating what may be referred to herein as top-down image data. In various examples, a machine learned model can determine the input data 106 based at least in part on down sampling and/or up sampling portions of the sensor data to achieve a desired resolution or data size for the input data. For example, lidar data, radar data, or other types of data included as part of the sensor data may be modified for use as input data (e.g., reduced in size and/or resolution) into a model that determines the output data 108 (e.g., the buffer region 112, the vehicle representation at time T1 116, the vehicle representation at time T2 118, etc.).

In various examples, the buffer determination component 104 can determine the output data 108 while the vehicle 102 navigates in the environment 100. For example, the output data 108 may represent a future state(s) of the vehicle 102 (and/or one or more objects) for different times in the future as the vehicle 102 navigates to a destination in the environment 100. In various examples, the buffer determination component 104 can receive the input data 106 from one or more components of the vehicle computing device and/or computing device(s) remote from the vehicle 102 and may determine actions associated with one of more predicted trajectories associated with the input data 106.

In some examples, the output data 108 can represent a heading displacement and/or a lateral displacement between a position and/or a heading of the vehicle 102 at different times. For example, historical data can indicate a first position of the vehicle 102 from a previous time, sensor data can indicate a second position of the vehicle at a current time, and simulation data can represent a third position of the vehicle at a future time. In some examples, the buffer determination component 104 can compare the first position, the second position, and/or the third position to identify differences in the respective positions. For example, the third position at the future time can be compared to a previous position associated with the first position of the second position, and a distance between the distances and/or a lateral distance from a predicted vehicle trajectory can be used to determine the lateral displacement of the vehicle 102 between two times.

In some examples, a vehicle computing device may control the vehicle 102 in the environment based at least in part on the output data 108 (e.g., determine an action to avoid the objects in the environment). For instance, the buffer determination component 104 may provide functionality of an attention system (e.g., a computing system in addition to a main computing system which may provide additional and/or redundant safety systems) for the vehicle 102 by identifying objects likely to cause an intersection and communicating intersection information about the identified objects to other components of the vehicle computing device. Accordingly, the intersection probability (e.g., a likelihood of an intersection between object(s) and the vehicle) may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 108 are discussed throughout this disclosure including in FIG. 2.

In various examples, the vehicle safety system can determine an intersection probability (e.g., a potential intersection) based at least in part on an occupancy grid comprising a plurality of grid points representing pixels in the environment. As a non-limiting example, the vehicle safety system may output one or more occupancy grids corresponding to one or more times in the future. If a grid portion overlaps with a known or expected position of the vehicle at that future time, a collision may be determined. In various examples, the vehicle safety system can process a representation of the object 120 and a representation of the vehicle 102 with a buffer region to determine a response to the scenario by the vehicle safety system.

Figure 2:
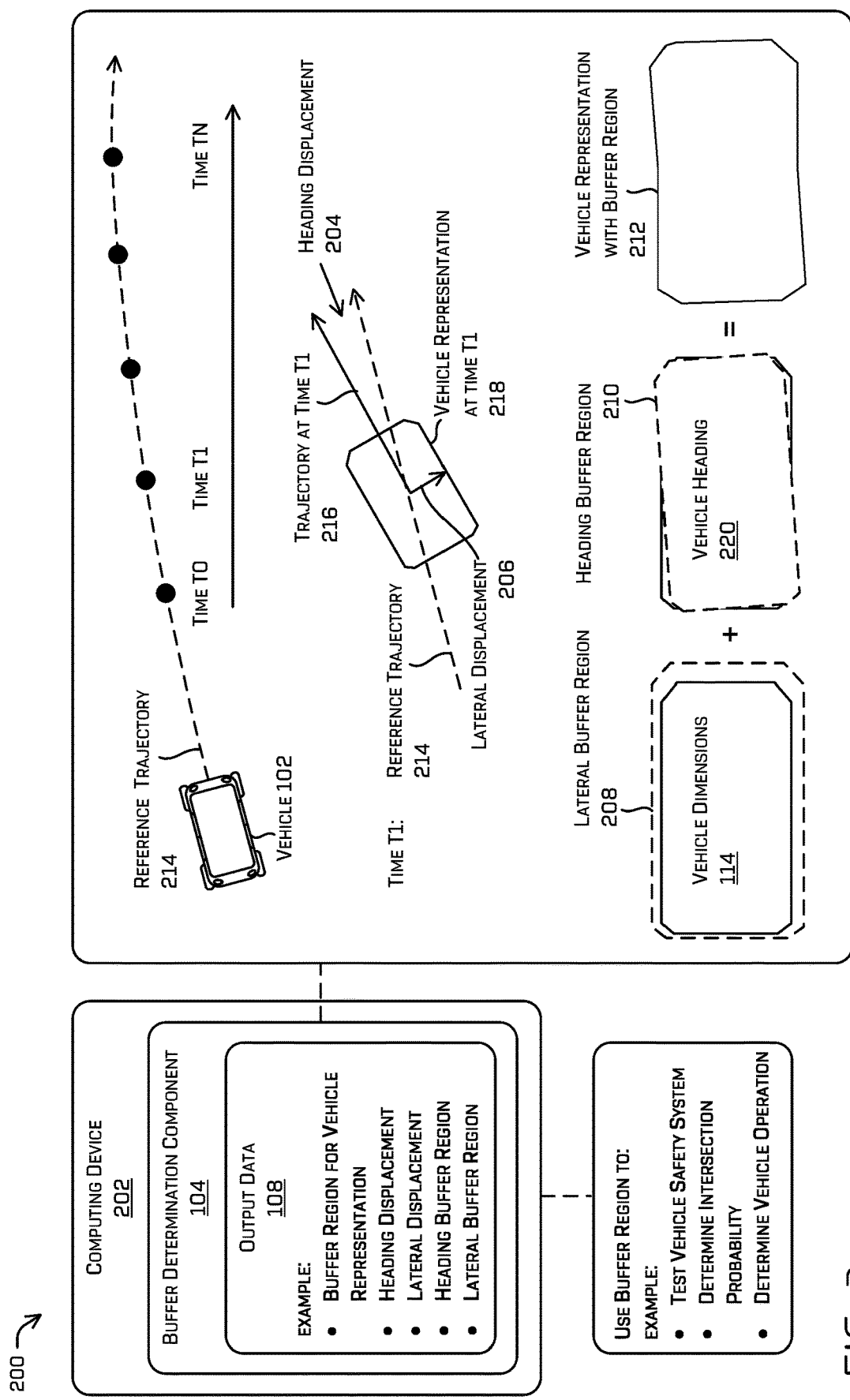
FIG. 2 is an illustration of an example computing device implementing an example model to determine a vehicle representation.

FIG. 2 is an illustration of an example computing device implementing an example model to determine a vehicle representation usable in a scenario 200. For instance, a computing device 202 can implement the buffer determination component 104 of FIG. 1 to determine the output data 108 representing one or more vehicle representations for different times in the scenario 200. In some examples, the computing device 202 may be associated with a vehicle safety system (e.g., the vehicle safety system 434) and may include the vehicle computing device(s) 404 and/or the computing device(s) 450.

As illustrated in FIG. 2, the computing device 202 can implement a secondary system (e.g., the vehicle safety system) to predict a scenario for one or more times T0, T1, ... TN (where N is an integer greater than 1) indicative of future states of the environment. For example, sensor data (or other data associated with the input data 106) can be used to perform one or more scenarios to determine vehicle representations for each time in the scenario. In some examples, the buffer determination component 104 can output the vehicle representations for use by a different model configured to identify potential objects that may intersect with the vehicle 102 at different times in the future. In one specific example, the scenarios may be performed for 2 seconds in the future to identify object(s) (e.g., a vehicle, a bicycle, a pedestrian, and so on) in an area around the vehicle 102.

In various examples, the secondary system can determine a response to the scenario at each time such as whether a portion the vehicle representation overlaps with a portion of an object representation. In some examples, the secondary system can send, based at least in part on the response, an indication of a potential intersection to a vehicle computing device. For example, based on at least one of the scenario(s) indicating that the scenario results in an object intersecting with the vehicle 102, the vehicle computing device can determine a candidate trajectory for the vehicle 102 to follow in the environment to avoid the potential intersection.

The buffer determination component 104 can, for example, process the input data 106 to generate the output data 108 representing a heading displacement 204, a lateral displacement 206, a lateral buffer region 208, a heading buffer region 210, and/or a vehicle representation with a buffer region 212. In various examples, the buffer determination component 104 can determine the vehicle representation with the buffer region 212 for each time associated with the scenario. The vehicle representation with the buffer region 212 can be determined is a variety of ways and can be based at least in part on the heading displacement 204, the lateral displacement 206, the lateral buffer region 208, and/or the heading buffer region 210 as described herein. FIG. 2 shows the vehicle representation with the buffer region 212 having a size and a shape that takes into account both the lateral displacement 206 (e.g., can be wider than the vehicle dimensions 114 in one or more directions) and the heading displacement 204 (e.g., can account for a variety of heading errors from different times of the scenario such as a maximum heading displacement).

In some examples, the buffer region 212 can be non-uniform around the representation of the vehicle 102. For instance, the buffer region 212 can comprise a different size or heading from a size or heading associated with the vehicle. The buffer region 212 may, for example, vary in shape and size and include a variety of dimensions and headings (e.g., a dimension different from a vehicle dimension and/or a heading different from a heading of the vehicle).

In some examples, the buffer determination component 104 can determine the heading displacement 204 and/or the lateral displacement 206 indicative of a difference between predicted state data (e.g., a predicted position, a predicted heading, etc.) and a current state data (e.g., a current position, a current heading, etc.) along a reference trajectory (a predicted trajectory), or a current trajectory at one or more respective times. The predicted state data can represent a predicted state of the vehicle 102 associated with a future time, and the buffer determination component 104 can determine differences (e.g., the heading displacement 204 and/or the lateral displacement 206) between the predicted state and a current state at a current time. Generally, the buffer determination component 104 can identify or determine one or more differences in a desired or predicted control operation and an actual control operation, and determine the buffer region based at least in part on the difference(s). By way of example and not limitation, at time T1 the heading displacement 204 can be a difference in a first heading associated with a reference trajectory 214 and a second heading associated with a trajectory (a current trajectory) at time T1 216. The reference trajectory 216 can represent a predicted trajectory of the vehicle 102 (e.g., a trajectory output by the planning component 424). The buffer determination component 104 can receive the reference trajectory 214 and the trajectory at time T1 216 as part of the input data 106 from one or more components of the computing device 202.

In some examples, the lateral displacement 206 can represent a difference between a distance from a center of the vehicle 102 to the trajectory at time T1 216 and a distance from the center of the vehicle (or other reference point associated with the vehicle) to the reference trajectory. The lateral displacement can represent a lateral difference, or lateral error, between a position of the vehicle (e.g., a center of an axle, such as a front axle or a rear axle) along the reference trajectory 214 (e.g., a planned trajectory) and an actual position of the vehicle 102 at time T1 (e.g., of the center of an axle relative to the reference trajectory).

In some examples, the buffer determination component 104 can determine the lateral buffer region 208 based at least in part on the lateral displacement from one or more times. For example, the buffer determination component 104 can determine a maximum lateral displacement among multiple lateral displacements over a period of time in the scenario. In such examples, the maximum lateral displacement can be used to determine the lateral buffer region 208 for the various times. In such an example, using the maximum lateral displacement may provide the most conservative safety measure when evaluating if a collision could occur between the two (vehicle and object).

In some examples, the buffer determination component 104 can determine the heading buffer region 210 based at least in part on the heading displacement from one or more times. For instance, respective heading displacements from multiple times can be compared one to another to identify a maximum heading displacement to form the heading buffer region 210. In some examples, the buffer determination component 104 can determine a maximum heading displacement based at least in part on applying a statistical algorithm to a current vehicle state with consideration to previous maximum heading displacement of the vehicle 102 (or other remote vehicle in a fleet of vehicles). In some examples, the previous maximum heading displacement can be associated with an area in the environment such as a previously detected corridor (e.g., a maximum heading displacement art a previous time can be used to determine a current maximum heading displacement). The heading buffer region 210 is shown in FIG. 2 as having a displacement from a vehicle heading 220 associated with the reference trajectory 214.

In some examples, the buffer determination component 104 can determine the maximum lateral displacement and/or the maximum heading displacement based at least in part on historical data associated with the vehicle 102. For example, the buffer determination component 104 can receive previous vehicle state information and previous error information to determine the maximum lateral displacement and/or the maximum heading displacement for a particular time period and/or location in the environment (e.g., a particular region of a roadway such as a curved road or an intersection, etc.)

In various examples, the vehicle representation with the buffer region 212 can be used by the computing device in a variety of ways including to test the vehicle safety system (e.g., validate a response, test for accuracy, etc.), to determine an intersection probability between the vehicle 102 and one or more objects, to determine operation of a component of the vehicle computing device, etc. By way of example and not limitation, responses to a scenario by the vehicle safety system can be used to determine whether one of more of: a perception component, planning component, or other component of the vehicle computing device, are operating correctly.

Figure 3:
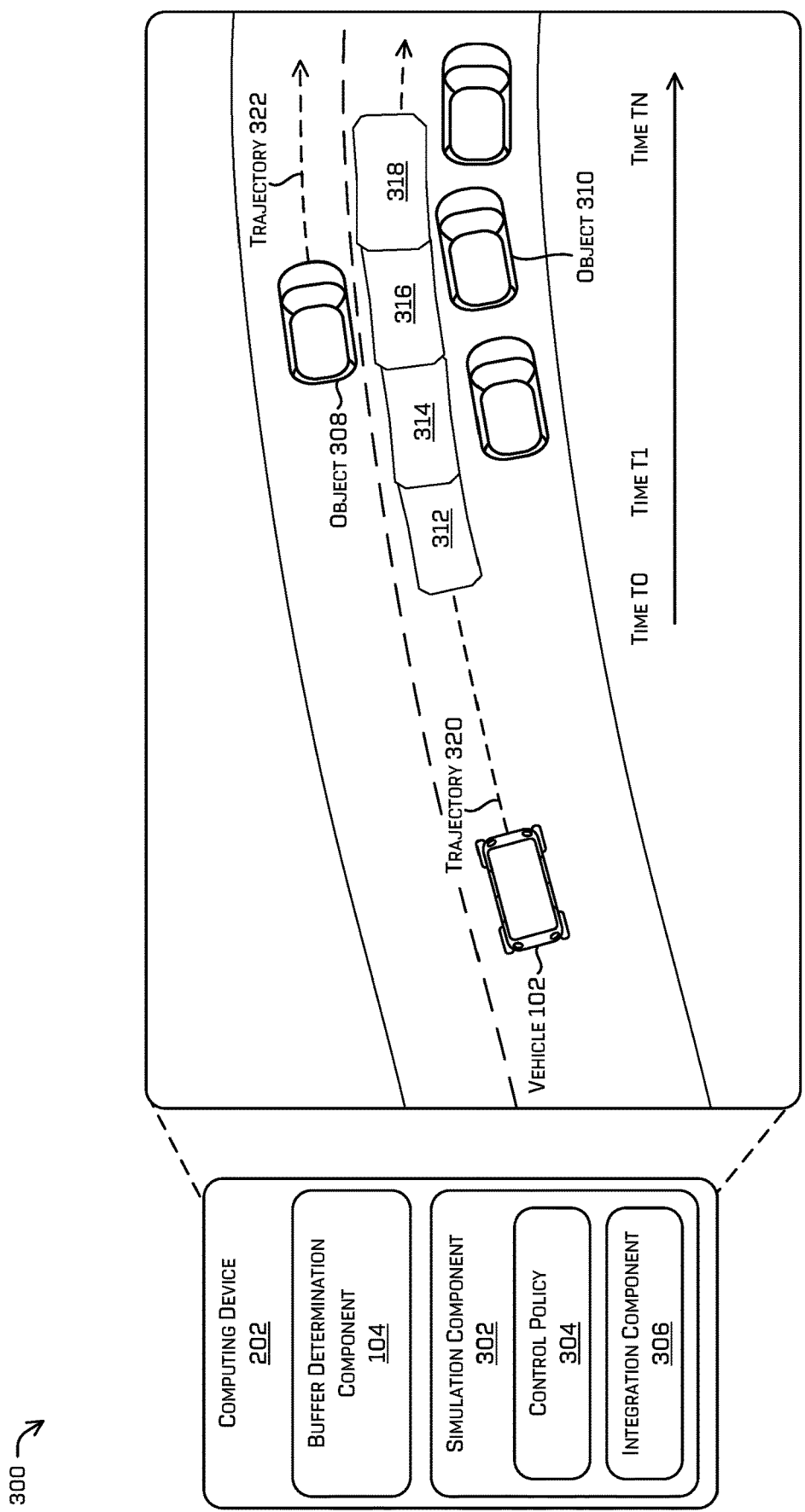
FIG. 3 is an illustration of another example environment, in which an example vehicle applies a model to determine a vehicle representation usable for predicting a likelihood of an intersection with one or more example objects.

FIG. 3 is an illustration of another example environment 300, in which an example vehicle applies a model to determine a vehicle representation usable for predicting a likelihood of an intersection with one or more example objects. FIG. 3 depicts the computing device 202 comprising the buffer determination component 104 and a simulation component 302 which further comprises a control policy 304 and an integration component 306. In some examples, the computing device can represent a vehicle safety system that implements the buffer determination component 104 to determine representations of the vehicle 102 in a scenario (simulation). The vehicle safety system can, for example, determine a response to the scenario indicating a potential intersection between the vehicle 102 and an object 308 (e.g., a vehicle) and/or an object 310 (e.g., a parked vehicle). In some examples, the simulation component 302 can determine an overlap between a portion of a vehicle representation associated with the vehicle 102 and one or more of: an object representation associated with the object 308 and/or an object representation associated with the object 310. In various examples, the vehicle safety system can send data indicating the response to a vehicle computing device configured to control the vehicle 102 in the scenario 200 or the example environment 300.

As depicted in FIG. 3, the buffer determination component 104 can determine a vehicle representation 312, a vehicle representation 314, a vehicle representation 316, and a vehicle representation 318 for different times. For example, each of the vehicle representations 312, 314, 316, and 318 can include a buffer region that is dynamically determined for a different time in a scenario initiated by the vehicle safety system. For example, the buffer determination component 104 can determine a first buffer region for the vehicle representation 312 at a given time in the scenario and a second buffer region for the vehicle representation 314 at a different time in the scenario, and so on. Thus, the buffer determination component 104 can output the vehicle representations 312, 314, 316, and 318 to include different buffer regions thereby potentially causing each vehicle representation to have a different shape and/or size at different times in the scenario. In this way, more accurate vehicle representations can be determined for use in the scenario versus not implementing the buffer determination component 104 which can improve safety of the vehicle 102.

In some examples, the buffer determination component 104 can output the vehicle representations 312, 314, 316, and 318 with consideration to a lateral displacement, a heading displacement, and/or a distance travelled relative to a trajectory 320 of the vehicle 102. The trajectory 320 can represent a predicted trajectory for the vehicle 102 to follow in the future, and the buffer determination component 104 can determine the lateral displacement, the heading displacement, and/or the distance travelled at different positions along the trajectory 320 at times in the future (e.g., every 0.1 second, or other timeframe). In some examples, the buffer determination component 104 can determine the vehicle representations 312, 314, 316, and 318, to each include an independent buffer region that are based at least in part on the lateral displacement, the heading displacement, and/or the distance travelled along the trajectory 320 for each respective time in the scenario.

In some examples, the simulation component 302 can provide functionality to simulate an action of the vehicle 102 and an action of the object 308 and/or the object 310 at different times in the future. The actions of the vehicle can represent a change in vehicle state (e.g., a change in velocity, acceleration, turn rate, yaw, and so on) from a first time to a second time. In some examples, an example vehicle action can include not changing the vehicle state (e.g., remaining in place such as staying in a lane, keeping a same steering action, braking action, and/or acceleration action). In some examples, the simulation component 302 can initiate an example scenario that represents the change in the vehicle state over time. In such examples, the scenario can include predictions about future positions and/or velocities of the vehicle and/or the object(s) in an environment proximate to the vehicle.

In some examples, the simulation component 302 can simulate possible actions for the vehicle 102 and/or objects (e.g., the objects 308 and 310) overtime. For instance, if a vehicle takes a first action at a first time, such as 1 second into the simulation, the simulation component 302 can determine a second action for the vehicle 102 based on the first action taken by the vehicle. In this way, the simulation component 302 can provide functionality to "actively" consider possible actions at each instance of the simulation (e.g., over 4 seconds) similar to how a driver makes decisions when operating a vehicle. In some examples, the simulation component 302 can determine actions for both the vehicle 102 and the objects that are dependent upon previous actions (or the vehicle or another object including object to object actions) as time increases during the simulation.

The control policy 304 can comprise one or more of: a physics policy, a dynamics policy, a kinematics policy, and/or a rules policy indicating how the vehicle and objects can potentially interact or indicating information about rules of the road such as a right of way associated with a roadway, an intersection, or a navigable surface. In some examples, the simulation component 302 can implement a machine learned model that accesses the control policy 304 to determine actions, trajectories, positions, or other data associated with the vehicle and/or object(s). For instance, the control policy 304 can be used by a machine learned model during a simulation performed by the simulation component 302.

As the vehicle 102 navigates in the environment 300, the object 308 may become closer to the vehicle 102 such that the simulation component 302 determines different potential actions (e.g., a braking action, an acceleration action, and the like) for the vehicle 102 to avoid a collision with the object 308.

In some examples, the object 310 representing a parked vehicle can be positioned relative to another object (e.g., the object 308, a static object, etc.) creating a corridor through which the vehicle 102 can travel to a destination. The vehicle 102 can implement the buffer determination component 104 to determine whether to brake due to the corridor being too small or to proceed through the corridor. As time changes from time T0 to time T1, the vehicle 102 can dynamically determine new vehicle representations resulting in more accurate representations as the vehicle 102 approaches the object 310. For instance, at time T0, as shown in FIG. 3, the vehicle representation 318 further from the vehicle 102 can have a larger size relative to the vehicle representation 312. At time T1, the vehicle representations used in a scenario can be adjusted, and the determination of whether to proceed through the corridor can be made based on the adjusted vehicle representations.

The simulation component 302 can determine the vehicle action based at least in part on predicting an object action (e.g., a change in speed, acceleration, braking, etc.) associated with the vehicle 308. For instance, the vehicle action can include steering, accelerating, and/or braking to avoid the vehicle 308 relative to the object action. At time T2, the simulation component 302 can determine the vehicle action based at least in part on predicting an object action associated with the vehicle 308.

In various examples, the vehicle action(s) can be determined based at least in part on the control policy 304 and the integration component 306. For instance, the integration component 306 can predict a response by the vehicle 102 to the scenario at time T0, the scenario at time T1, and/or the scenario at time TN based at least in part on data associated with the control policy 304 (e.g., information indicating rules of the road such as a right of way associated with a roadway, an intersection, or a navigable surface). In some examples, the integration component 306 can identify or otherwise determine an overlap between the vehicle representation and an object representation, and predict an action for the vehicle 102 based at least in part on the overlap. In such examples, the integration component 306 can generate a signal indicative of the responses, and send the signal to another model or component of a vehicle computing device for validating commands such as determinations by the planning component 424 (e.g., determining a candidate trajectory for the vehicle 102).

While described as a separate system, in some examples, techniques to evaluate trajectories described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
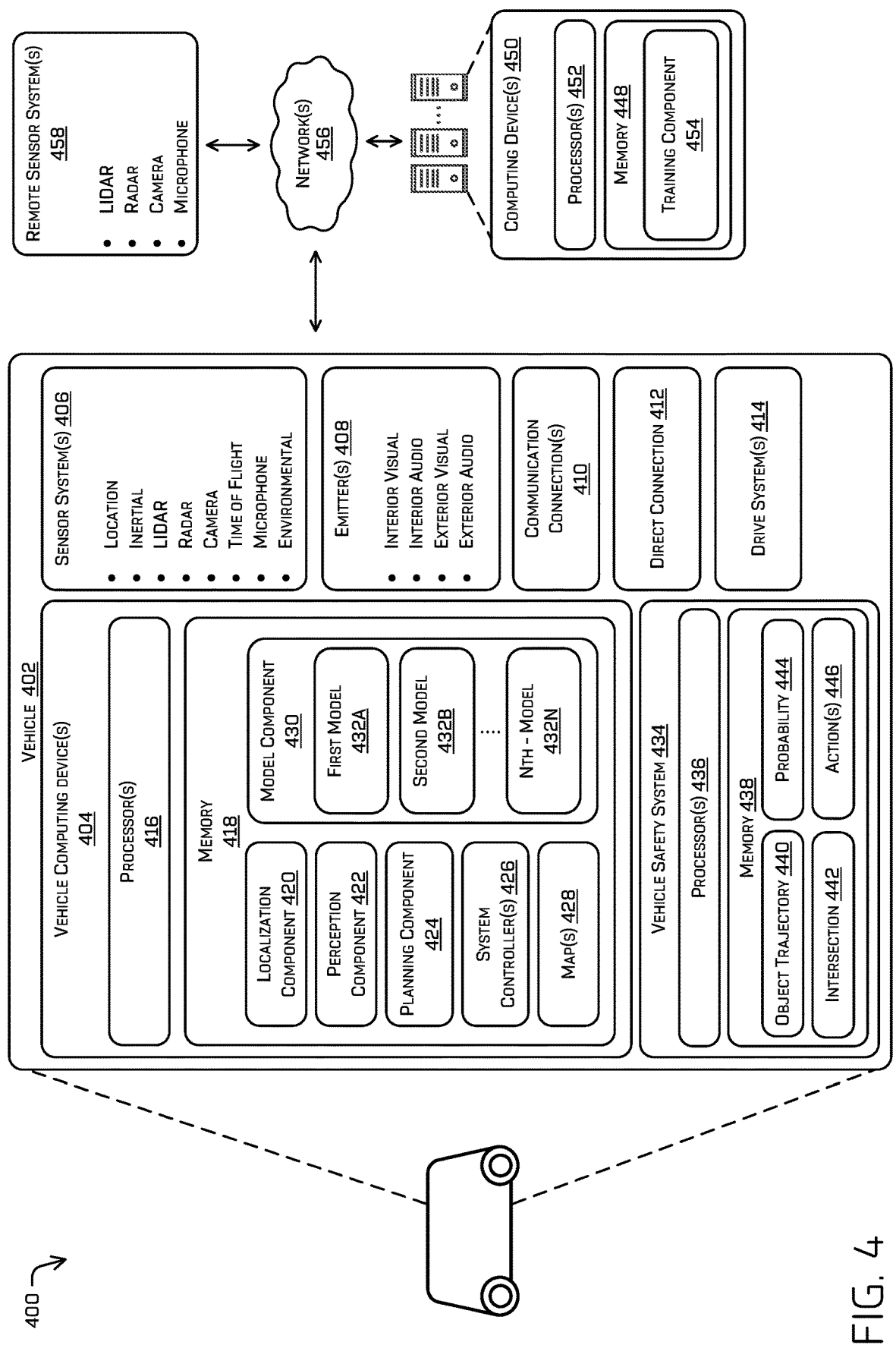
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404 (also referred to as a vehicle computing device 404 or vehicle computing device(s) 404), one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428, and a model component 430 including one or more models, such as a first model 432A, a second model 432B, up to an Nth model 432N (collectively "models 432"), where N can be any integer greater than 1. Though depicted in FIG. 4 as residing in the memory 418 for illustrative purposes, it is contemplated that the localization component 420, the perception component 422, the planning component 424, the one or more system controllers 426, the one or more maps 428, and/or the model component 430 including the models 432 may additionally, or alternatively, be accessible to the vehicle 402 (e.g., stored on, or otherwise accessible by, memory remote from the vehicle 402, such as, for example, on memory 448 of a remote computing device 450).

Additionally, vehicle 402 may include a vehicle safety system 434, including an object trajectory component 440, an intersection component 442, a probability component 444, and an action component 446. As shown in this example, the vehicle safety system 434 may be implemented separately from the vehicle computing device(s) 404, for example, for improved performance of the vehicle safety system, and/or to provide redundancy, error checking, and/or validation of determinations and/or commands determined by the vehicle computing device(s) 404. However, in other examples, the vehicle safety system 434 may be implemented as one or more components within the same vehicle computing device(s) 404.

By way of example, the vehicle computing device(s) 404 may be considered to be a primary system, while the vehicle safety system 434 may be considered to be a secondary system. The primary system may generally perform processing to control how the vehicle maneuvers within an environment. The primary system may implement various artificial intelligence (AI) techniques, such as machine learning, to understand an environment around the vehicle 402 and/or instruct the vehicle 402 to move within the environment. For example, the primary system may implement the AI techniques to localize the vehicle, detect objects around the vehicle, segment sensor data, determine classifications of the objects, predict object tracks, generate trajectories for the vehicle 402 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 406.

In some examples, the vehicle safety system 434 may operate as separate system that receives state data (e.g., perception data) based on the sensor data and AI techniques implemented by the primary system (e.g., vehicle computing device(s) 404), and may perform various techniques described herein for improving collision prediction and avoidance by the vehicle 402. As described herein, the vehicle safety system 434 may implement techniques for predicting intersections/collisions based on sensor data, as well as probabilistic techniques that are based on positioning, velocity, acceleration, etc. of the vehicle and/or objects around the vehicle. In some examples, the vehicle safety system 434 can be configured to perform the functionality of the buffer determination component 104. In some examples, the vehicle safety system 434 may process data from sensors, such as a subset of sensor data that is processed by the primary system. To illustrate, the primary system may process lidar data, radar data, image data, depth data, etc., while the vehicle safety system 434 may process just lidar data and/or radar data (and/or time of flight data). In other examples, however, the vehicle safety system 434 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 4 as residing in the memory 418 for illustrative purposes, it is contemplated that the localization component 420, the perception component 422, the planning component 424, the model component 430, the system controllers 426, and the maps 428 may additionally, or alternatively, be accessible to the vehicle 402 (e.g., stored on, or otherwise accessible by, memory remote from the vehicle 402, such as, for example, on memory 448 of a remote computing device 450). Similarly, the object trajectory component 440, intersection component 442, probability component 444, and/or action component 446 are depicted as residing in the memory 438 of the vehicle safety system 434, one or more of these components may additionally, or alternatively, be implemented within vehicle computing device(s) 404 or may be accessible to the vehicle 402 (e.g., stored on, or otherwise accessible by, memory remote from the vehicle 402, such as, for example, on memory 448 of a remote computing device 450).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428 and/or map component 428, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect or determine gravity, detect objects in an environment, generate routes, determine actions and/or trajectories to navigate within an environment.

In some examples, the one or more maps 428 may be stored on a remote computing device(s) (such as the computing device(s) 450) accessible via network(s) 456. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device 404 may include a model component 430. The model component 430 may be configured to perform the functionality of the buffer determination component 104 including at least dynamically determining one or more representations of the vehicle 402 over time. For instance, the model component 430 can determine a vehicle representation with a buffer region, and the buffer region can be based at least in part on a distance travelled from a first position to a second position, a heading displacement (e.g., the heading displacement 204), and/or a lateral displacement (e.g., the lateral displacement 206) as described herein. In various examples, the model component 430 may receive sensor data associated with an object from the localization component 420, the perception component 422, and/or from the sensor system(s) 406. In some examples, the model component 430 may receive map data from the localization component 420, the perception component 422, the maps 428, and/or the sensor system(s) 406. While shown separately in FIG. 4, the model component 430 could be part of the localization component 420, the perception component 422, the planning component 424, or other component(s) of the vehicle 402.

In various examples, the model component 430 may send output(s) from the first model 432A, the second model 432B, and/or the Nth model 432N may be used by the perception component 422 to alter or modify an amount of perception performed in an area of the object based on an associated intersection value. In some examples, the planning component 424 may determine one or more actions (e.g., reference actions and/or sub-actions) for the vehicle 402 based at least in part on output(s) from the model component 430. In some examples, the model component 430 may be configured to output information indicating a probability that an object is likely to cause a collision. In some examples, the model component 430 may include at least the functionality provided by the model component 104 of FIG. 1.

In some examples, the model component 430 may communicate an output to the perception component 422 to cause an update to one or more parameters (e.g., bias values, drift values, and the like) associated with the sensor system(s) 406.

In various examples, the model component 430 may utilize machine learning techniques to determine a vehicle representation usable in a scenario, as described herein. In such examples, machine learning algorithms may be trained to predict a lateral displacement, a heading displacement, or other difference between a predicted trajectory and a current trajectory. In some examples, the model component 430 may utilize machine learning techniques to determine whether the vehicle representation with a buffer region overlaps with an object intersection. For example, the model component 430 may receive ground truth (e.g., buffer region data, map data, environmental data, sensor data, and so on) associated with a vehicle in a simulated environment and/or a real-world environment and be trained to output a buffer region that takes into consideration an area of the environment, weather conditions, vehicle behavior, etc.

The vehicle safety system 434 may include an object trajectory component 440 configured to determine a trajectory for the vehicle 402 and/or trajectories for other objects identifying within an environment, using the various systems and techniques described herein. In some examples, the object trajectory component 440 may receive planning data, perception data, and/or map data from the components 420-426 to determine a planned trajectory for the vehicle 402 and trajectories for the other objects in the environment.

In various examples, the object trajectory component 440 may generate a set of single points and/or pairs of related points (e.g., for a path polygon) representing a trajectory. In some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 402 or object for which the trajectory is determined.

In some examples, the object trajectory component 440 determine a single planned trajectory for the vehicle 402 (e.g., based on planning data and map data received from the planning component 424 and maps 428, and may determine multiple trajectories for one or more other moving objects (e.g., vehicle 120) in the environment in which the vehicle 402 is operating. In some examples, the trajectories of another object may include any number of possible paths in which the object may travel from a current position (e.g., at the time of perception) and/or based on a direction of travel. Based on the determination that the agent is within the threshold distance or time to the vehicle 402, the object trajectory component 440 may determine the trajectories associated with the object. In some examples, the object trajectory component 440 may be configured to determine the possible trajectories of each detected moving object in the environment.

In various examples, the intersection component 442 may use the various techniques described herein to determine intersections between the trajectory of the vehicle 402 and/or one or more of the trajectories for other objects in the environment, to determine whether a potential collision zone may exist in the environment. A potential collision zone may include an area in which, based on the object state data, vehicle state data, and/or the trajectories, an intersection may occur between the vehicle 402 and an object (e.g., vehicle 120). In at least some examples, a trajectory for the object and object attributes (e.g., object size, position, orientation, pose, etc.) may be used to calculate an intersection point (or overlap) between the object and the vehicle. In such examples, a collision zone may be defined by the overlapping area between a portion of the vehicle 402 associated with a vehicle representation having a buffer region and at least a portion of the object associated with an object representation.

In some examples, the potential collision zone may exist between the vehicle 402 and the object if the trajectory associated with the vehicle 402 intersects with at least one trajectory associated with the object. In various examples, the intersection component 442 may determine that the potential collision zone may exist between the vehicle 402 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 402 and/or the object, as described in detail herein.

In some examples, the intersection component 442 may expand the edges of the vehicle trajectory and/or the object trajectory, from the center of the vehicle 402 and object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 442 may determine that the potential collision zone exists. If the expanded width of the vehicle trajectories and/or path polygons do not intersect and/or pass by more than the minimum allowable distance, the intersection component 442 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 442 may be configured to determine the bounds of the potential collision zone. In some examples, the potential collision zone may include four elements, a vehicle enter point, a vehicle exit point, an object enter point, and an object exit point. Each of the vehicle 402 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the trajectory of the object prior to an intersection (e.g., convergence) with the trajectory or path polygon for the vehicle 402. In some examples, an object exit point position may be determined by identifying the first trajectory sample associated with the object trajectory after the convergence between the trajectory of the object and the trajectory or path polygon of the vehicle 402. The distance associated with object enter point and the object exit point may be derived from the respective positions as a distance along the trajectory.

In various examples, the probable velocities of the object may be derived from probable accelerations (e.g., positive and negative accelerations) of the intersection component 442. The accelerations may include positive accelerations based on a fast-behavioral model (e.g., aggressive behavior) and negative accelerations based on a slow-behavioral model (e.g., conservative behavior). In various examples, the positive accelerations associated with the object may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the object may represent a maximum amount of negative acceleration probable in the environment, such as that based on the initial velocity of the object.

In various examples, intersection component 442 may determine position lines and/or position cones for the object and the vehicle 402 respective to the potential collision zone. The position lines and/or cones for the vehicle 402 and the object may be based on the object entry time, object exit time, vehicle entry time, and vehicle exit time with respect to the potential collision zone. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 422). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 444 may determine a prediction of an intersection between the vehicle 402 and/or the other object (e.g., vehicle 120) and/or a probability/risk of collision, based on the time-space overlap analyses performed by the intersection component 442. In some examples, the probability component 444 may determine a probability of an intersection based on a single trajectory of the vehicle 402 and a single trajectory of the object, based on an overlap between position lines and/or position cones of the vehicle 402 and object with respect to the potential collision zone. For instance, based on where in the potential collision zone that the position lines overlap, and/or the amount of overlap between the position cones (e.g., the time gap, percentage of cone overlap, etc.), the probability component 444 may determine that a risk of collision may be relatively high, medium, or low.

Additionally, using the various techniques described herein, the probability component 444 also may determine an overlap between a vehicle representation with a buffer region and an object representation that represents a probability of an intersection between the vehicle 402 and an object. For example, the intersection component 442 may analyze one or more representations of the object relative to the vehicle representation, and the probability component 444 may determine a single collision prediction based on the results of the analyses (e.g., identifying an overlap). In some examples, the probability component 444 may determine the overlap between the vehicle representation with the buffer region and multiple object representations for one or more times.

In various examples, the action component 446 may determine one or more actions for the vehicle 402 to take, based on predictions and/or probability determinations of an intersection between the vehicle 402 another object (e.g., vehicle 102), along with other factors. The action may include slowing the vehicle to yield to the object, stopping the vehicle to yield to the object, changing lanes or swerving left, or changing or swerving lanes right, etc. Based on the determined action, the vehicle computing device(s) 404, such as through the system controller(s) 426, may cause the vehicle 402 to perform the action. In at least some examples, such an action may be based on the probability of collision, determined by the probability component 444 based on multiple trajectories for the object, as described in detail. In various examples, responsive to determining to adjust a lateral position of the vehicle, such as in a lane change to the left or to the right, the vehicle safety system 434 may cause the components 440-446 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 402.

The action component 446 may determine, in some examples, one or more actions for the vehicle 402 to take, based on receiving a signal form the model component 430. For instance, the model component 430 can determine an intersection probability between the vehicle 402 and one or more objects and generate a signal for sending to the action component 446 after comparing a vehicle representation and an object representation. In some examples, the model component 430 can determine a buffer region for the vehicle 402 based on a maximum error (e.g., a maximum lateral displacement and/or a maximum heading displacement) and combine the buffer region with vehicle dimensions to determine the vehicle representation. The model component 430 can determine an intersection probability based at least in part on an overlap between the vehicle representation and respective representation(s) associated with object(s) that may impact operation of the vehicle 402 (e.g., cause an intersection, affect passenger comfort, impact vehicle safety, etc.)

As can be understood, the components discussed herein (e.g., the localization component 420, the perception component 422, the planning component 424, the one or more system controllers 426, the one or more maps 428, and the vehicle safety system 434 including the object trajectory component 440, the intersection component 442, the probability component 444, and the action component 446 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 448, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 456, to the one or more computing device(s) 450 at a particular frequency, after a lapse of a predetermined period of time, in near real-time, etc. In some examples, the model component 430 may receive sensor data from one or more of the sensor system(s) 406.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 450, other nearby vehicles, etc.) and/or one or more remote sensor system(s) 458 for receiving sensor data. The communication connection(s) 410 also enable the vehicle 402 to communicate with a remote teleoperations computing device or other remote services.

The communication connection(s) 410 may include physical and/or logical interfaces for connecting the vehicle computing device 404 to another computing device or a network, such as network(s) 456. For example, the communication connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 456, to the computing device(s) 450. In at least one example, the localization component 420, the perception component 422, the planning component 424, the one or more system controllers 426, the one or more maps 428, and the model component 430 may send their respective outputs to the computing device(s) 450 at a particular frequency, after a lapse of a predetermined period of time, in near real-time, etc.

In some examples, the vehicle 402 may send sensor data to the computing device(s) 450 via the network(s) 456. In some examples, the vehicle 402 may receive sensor data from the computing device(s) 450 and/or remote sensor system(s) 458 via the network(s) 456. The sensor data may include raw sensor data and/or processed sensor data and/or representations of sensor data. In some examples, the sensor data (raw or processed) may be sent and/or received as one or more log files.

The computing device(s) 450 may include processor(s) 452 and a memory 448 storing a training component 454.

In some instances, the training component 454 can include functionality to train a machine learning model to output classification values. For example, the training component 454 can receive data that represents labelled collision data (e.g., publicly available data, sensor data, and/or a combination thereof). At least a portion of the data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 454 can be trained to output intersection values associated with objects during simulation (e.g., occupancy predictions), as discussed herein.

In some examples, the training component 454 may be implemented to train the model component 430. Training data may include a wide variety of data, such as image data, video data, lidar data, radar data, audio data, other sensor data, etc., that is associated with a value (e.g., a desired classification, inference, prediction, etc.). Such values may generally be referred to as a "ground truth." In such examples, the training component 454 may determine a difference between the ground truth (e.g., training data) and output(s) by the training component 454. Based at least in part on the difference(s), training by the training component 454 may include altering a parameter of the machine-learned model to minimize the difference(s) to obtain a trained machine-learned model that is configured to determine potential intersection(s) between object(s) in the environment and the vehicle 402.

In various examples, during training, the model component 430 may adjust weights, filters, connections between layers, and/or parameters for training the individual untrained neural networks to predict potential intersection(s) (or other tasks), as discussed herein. In some instances, the model component 430 may use supervised or unsupervised training.

In some examples, the training component 454 can include training data that has been generated by a simulator. For example, simulated training data can represent examples where a vehicle collides with an object in an environment or nearly collides with an object in an environment, to provide additional training examples.

In some examples, functionality provided by the training component 454 may be included and/or performed by the vehicle computing device 404.

The processor(s) 416 of the vehicle 402, processor(s) 436 of the vehicle safety system 434, and/or the processor(s) 452 of the computing device(s) 450 may be any suitable processor capable of executing instructions to process data and perform operations as described herein. By way of example and not limitation, the processor(s) 416, 436, and 452 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418, memory 438, and memory 448 are examples of non-transitory computer-readable media. The memory 418, the memory 438, and/or memory 448 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418, the memory 438, and memory 448 may include at least a working memory and a storage memory. For example, the working memory may be a high-speed memory of limited capacity (e.g., cache memory) that is used for storing data to be operated on by the processor(s) 416, 436, and/or 452. In some instances, the memory 418, the memory 438, and memory 448 may include a storage memory that may be a lower-speed memory of relatively large capacity that is used for long-term storage of data. In some cases, the processor(s) 416, 436, and/or 452 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 450 and/or components of the computing device(s) 450 may be associated with the vehicle 402. That is, the vehicle 402 may perform one or more of the functions associated with the computing device(s) 450, and vice versa. For instance, either the vehicle 402 and/or the computing device(s) 450 may perform training operations relating to one or more of the models described herein.

Figure 5A:
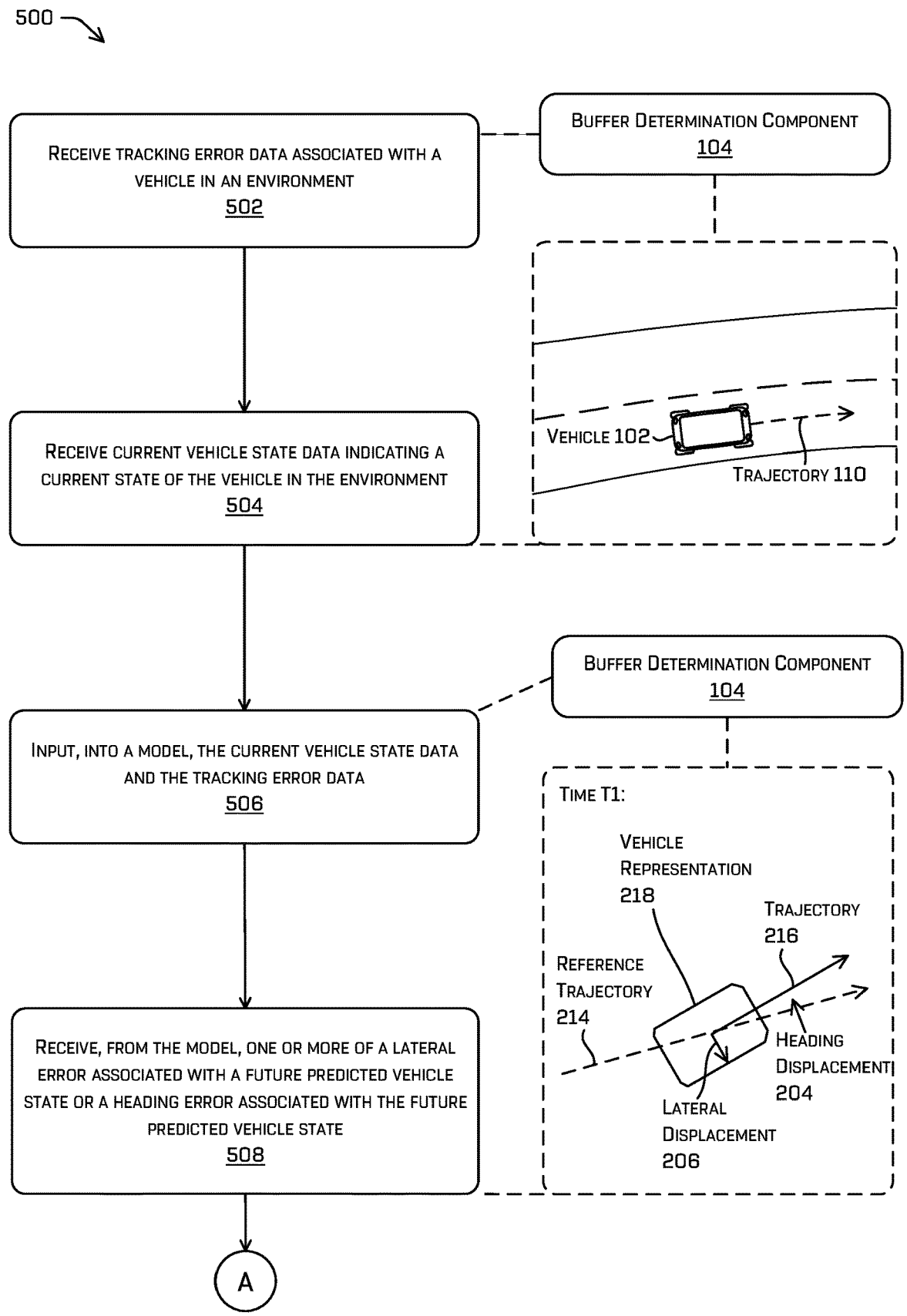
FIG. 5A is a first part of a flowchart depicting an example process for determining a vehicle representation using one or more example models.
Figure 5B:
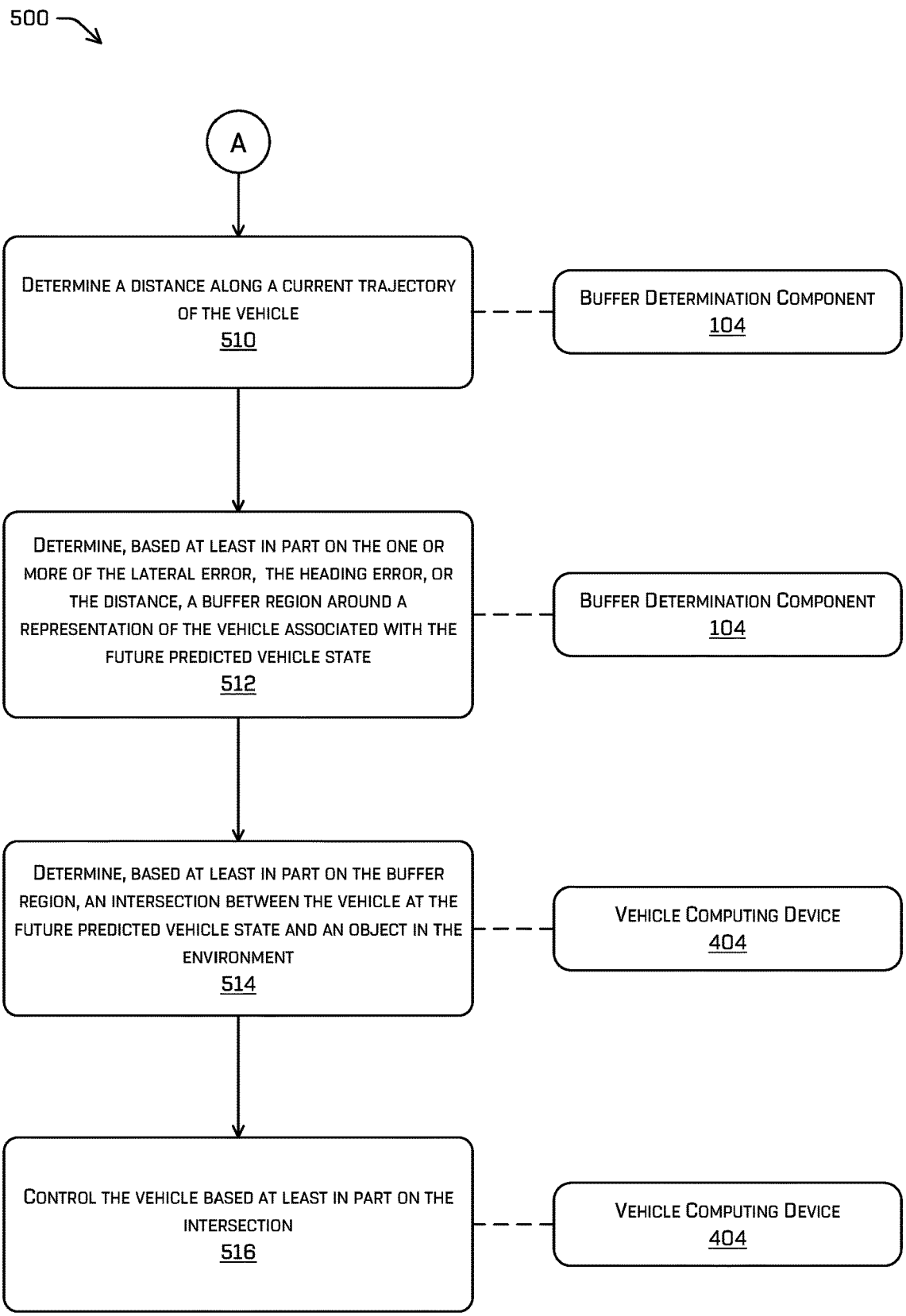
FIG. 5B is a second part of the flowchart depicting the example process for determining a vehicle representation using one or more example models.

FIG. 5A is a first part of a flowchart depicting an example process 500 for determining a vehicle representation using one or more example models. FIG. 5B is a second part of the flowchart depicting the example process 500 for determining a vehicle representation using one or more example models. Some or all of the process 500 may be performed by one or more components in FIG. 4, as described herein. For example, some or all of process 500 may be performed by the vehicle computing device 404 and/or the vehicle safety system 434.

At operation 502, the process may include receiving tracking error data associated with a vehicle in an environment, the tracking error data comprising a difference between a prior predicted vehicle state and a measured vehicle state associated with the prior predicted vehicle state. The tracking error data can represent errors, or differences, between a position and/or heading associated with a previous state of the vehicle and a measured state of the vehicle (e.g., a measured position, measured heading, etc.) at a particular time. In some examples, the operation 502 may include the buffer determination component 104 receiving historical data associated with one or more of: sensor data, log data, vehicle state data, simulation data, etc. The historical data can be associated with the vehicle 102 and/or one or more objects in an environment of the vehicle 102 (e.g., the environment 100, the scenario 200, or the environment 300). The one or more objects may represent a pedestrian, a group of pedestrians, another vehicle, and so on. The historical data may be received from a vehicle computing device that stores data from one or more sensors on the vehicle and/or from one or more remote sensors. The vehicle computing device may send historical state data representing characteristics of the vehicle and/or object(s) at a previous time to the buffer determination component 104. For instance, the historical data may include the trajectory 110 (a predicted trajectory used as a starting reference point in a scenario, and also referred to as a reference trajectory) for the vehicle 102 to follow in the environment (e.g., a real-world environment and/or a simulated environment). In some examples, the historical tracking error data can represent an error (e.g., a lateral error, a position error, a heading error, etc.) associated with a previous time as the vehicle 102 navigates in the environment.

At operation 504, the process may include receiving current vehicle state data indicating a current state of the vehicle in the environment. In some examples, the operation 504 may include the buffer determination component 104 receiving state data (e.g., trajectory data, position data, yaw data, velocity data, steering rate data, steering angle data, etc.) of the vehicle 102 for a current time as the vehicle 102 navigates in the environment. For example, the buffer determination component 104 can receive a current trajectory of the vehicle 102 that the vehicle 102 follows in the environment and can be different from the predicted trajectory due to actions taken by the vehicle in the environment (e.g., an action taken in a scenario after the predicted trajectory was determined).

At operation 506, the process may include inputting, into a model, the current vehicle state data and the tracking error data. In some examples, the operation 506 may include the buffer determination component 104 receiving the current vehicle state data and the tracking error data.

At operation 508, the process may include receiving, from the model, one or more of a lateral error associated with a future predicted vehicle state or a heading error associated with the future predicted vehicle state. In some examples, the operation 508 may include the buffer determination component 104 determining the lateral displacement 206 based at least in part on comparing an expected or predicted position of the vehicle 102 associated with the current trajectory at the first time and a current position of the vehicle representation 218 (relative to the current trajectory, for example). In some examples, the lateral error can represent a distance between a center axel of the vehicle 102 associated with the predicted position and a center axel of the vehicle 102 associated with the current position. The operation 508 may also or instead include the buffer determination component 104 determining the heading displacement 204 based at least in part on comparing a heading of the vehicle 102 associated with the predicted heading at the first time and a current heading of the vehicle representation 218 associated with the current trajectory.

At operation 510, the process may include determining a distance along a current trajectory of the vehicle. The operation 510 may include determining a distance from a first point of the current trajectory and a second point of the current trajectory. In some examples, the buffer determination component 104 can determine a distance along a trajectory of the vehicle (a distance along a predicted trajectory such as an arc length between a first position (e.g., a starting point at a first time of a scenario) and a second position (e.g., another point along the current trajectory at a second time of the scenario)).

At operation 512, the process may include determining, based at least in part on the one or more of the lateral error, the heading error, or the distance, a buffer region around a representation of the vehicle associated with the future predicted vehicle state. In some examples, the operation 512 may include the buffer determination component 104 determining the vehicle representation with the buffer region 212, the lateral buffer region 208, and/or the heading buffer region 210.

In some examples, the operation 512 may include the buffer determination component 104 determining the buffer region 112 based at least in part on applying one or more algorithms (e.g., a machine learned algorithm, a statistical algorithm, a kinematic algorithm, a heuristic, etc.) to values associated with the lateral displacement 206, the heading displacement 204, and the arc length (or other distance measurement). In some examples, the buffer region can also be adjusted, or otherwise determined, based at least in part on the steering rate data and/or the steering angle data associated with the vehicle 102. For example, the vehicle 102 may be approaching a maximum steering rate, and dimensions of the buffer region can be adjusted to reflect an impact of the maximum steering rate limit which can cause larger deviations in lateral and heading determinations relative to a steering rate limit less than the maximum steering rate limit.

In some examples, the operation 512 may be followed by the operation 502 for a different time in the future. For example, the buffer determination component 104 can receive historical data and/or the vehicle state data representing another time in a scenario. In other words, the buffer determination component 104 can determine a buffer region for each time in a scenario (e.g., every 0.1 seconds for two seconds), and the dynamically adjusted buffer region can be based at least in part on an average and/or maximum of lateral displacements and/or an average of heading displacements associated with each buffer region determination during the scenario.

At operation 514, the process may include determining, based at least in part on the buffer region, an intersection between the vehicle at the future predicted vehicle state and an object in the environment. For instance, the buffer determination component 104 (or other model) can determine an overlap between the vehicle representation with the buffer region 212 and an object representation. In some examples, the operation 514 may include the vehicle computing device 404 or the vehicle safety system 434 determining a likelihood of an intersection between the vehicle 102 and an object based at least in part on the overlap between the vehicle representation with the buffer region and the object representation. In some examples, the operation 514 may include determining an intersection point and an intersection time using an occupancy grid. In some examples, the operation 514 may include determining a response to a scenario and sending an indication of the response to a component of the vehicle computing device to control the vehicle 102 in the environment (e.g., the planning component 424 can determine a vehicle trajectory to avoid the object).

At operation 516, the process may include controlling the vehicle based at least in part on the intersection. In some examples, controlling the vehicle 102 can include determining a candidate trajectory for the vehicle 102 that avoids a potential intersection with the object. In various examples, a planning component (e.g., planning component 424) of the vehicle computing device may use the predictions received from the buffer determination component 104 to control a vehicle as it navigates in an environment. In various examples, predictions from the buffer determination component 104 enable a planning component of the vehicle to improve how the vehicle navigates (avoids objects) in the environment.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, only one of operations 506, 508, or 510 may be performed to determine operation 510. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving tracking error data associated with a vehicle in an environment, the tracking error data comprising a difference between a prior predicted vehicle state and a measured vehicle state associated with the prior predicted vehicle state; receiving current vehicle state data indicating a current state of the vehicle in the environment; inputting, into a model, the current vehicle state data and the tracking error data; receiving, from the model, one or more of a lateral error associated with a future predicted vehicle state or a heading error associated with the future predicted vehicle state; determining a distance along a current trajectory of the vehicle; determining, based at least in part on the one or more of the lateral error, the heading error, or the distance, a buffer region around a representation of the vehicle associated with the future predicted vehicle state; determining, based at least in part on the buffer region, an intersection between the vehicle at the future predicted vehicle state and an object in the environment; and controlling the vehicle based at least in part on the intersection.

B: The system of paragraph A, wherein controlling the vehicle comprises: determining, based at least in part on the intersection, a candidate trajectory for the vehicle to follow; and controlling the vehicle based at least in part on the candidate trajectory.

C: The system of paragraph A or B, wherein predicting the intersection comprises determining an amount that the buffer region around the representation of the vehicle intersects with a representation of the object.

D: The system of any of paragraphs A-C, wherein: the current vehicle state data comprises steering rate data or steering angle data, and determining the buffer region is further based at least in part on the steering rate data or the steering angle data.

E: The system of any of paragraphs A-D, wherein determining the buffer region comprises: determining, based at least in part on the tracking error data, a maximum observed tracking error; and scaling the lateral error or the heading error based at least in part on the tracking error data and the distance along the current trajectory of the vehicle.

F: One or more non-transitory computer-readable media storing instructions executable by one or more processors, wherein the instructions, when executed, cause the one or more processors to perform operations comprising: determining an error representing a difference between a predicted state of a vehicle and a current state of the vehicle associated with the predicted state, the error comprising one or more of a heading error or a position error; determining a buffer region around a representation of the vehicle based at least in part on the error and historical error data; and controlling the vehicle relative to an object in an environment based at least in part on the buffer region.

G: The one or more non-transitory computer-readable media of paragraph F, wherein determining the buffer region comprises: inputting the one or more of the current state of the vehicle, the error, a distance along a trajectory of the vehicle, or historical error data into a model; and receiving, from the model, the buffer region.

H: The one or more non-transitory computer-readable media of paragraph F or G, wherein determining the buffer region comprises: determining, based at least in part on tracking error data, a maximum observed tracking error; and scaling the position error or the heading error based at least in part on the tracking error data and a distance along a current trajectory of the vehicle.

I: The one or more non-transitory computer-readable media of any of paragraphs F-H, wherein controlling the vehicle relative to the object comprises: predicting, based at least in part on the buffer region, an intersection between the vehicle and the object; and determining a candidate trajectory for the vehicle to follow based at least in part on the intersection.

J: The one or more non-transitory computer-readable media of any of paragraphs F-I, the operations further comprising: dynamically adjusting the buffer region around the representation of the vehicle based at least in part on tracking error data and a distance along a trajectory of the vehicle.

K: The one or more non-transitory computer-readable media of any of paragraphs F-J, the operations further comprising: determining that the buffer region around the representation of the vehicle and a representation of the object overlap; determining, based at least in part on the overlap, a potential intersection between the vehicle and the object; and updating an instruction to control the vehicle relative to the object in the environment further based at least in part on the overlap.

L: The one or more non-transitory computer-readable media of any of paragraphs F-K, the operations further comprising: receiving, by a model, steering rate data or steering angle data representing the predicted state of the vehicle, and determining, by the model, the buffer region around the representation of the vehicle further based at least in part on the steering rate data or the steering angle data.

M: The one or more non-transitory computer-readable media of any of paragraphs F-L, wherein the buffer region comprises different size or heading from a size or heading associated with the vehicle.

N: The one or more non-transitory computer-readable media of any of paragraphs F-M, wherein the buffer region around the representation of the vehicle comprises a heading that is different from a predicted heading of the vehicle.

O: The one or more non-transitory computer-readable media of any of paragraphs F-N, wherein the error comprises a first error and the operations further comprising: determining a second error associated with a previous predicted state of the vehicle; determining a maximum error based at least in part on the first error and the second error; and determining the buffer region around the representation of the vehicle further based at least in part on the maximum error.

P: The one or more non-transitory computer-readable media of any of paragraphs F-O, wherein the buffer region is a first buffer region, and the operations further comprising: determining an object type associated with the object in the environment; and determining, based at least in part on the object type, a second buffer region around the representation of the vehicle, wherein controlling the vehicle relative to the object in the environment is further based at least in part on the second buffer region.

Q: A method comprising: determining an error representing a difference between a predicted state of a vehicle and a current state of the vehicle associated with the predicted state, the error comprising one or more of a heading error or a position error; determining a buffer region around a representation of the vehicle based at least in part on the error and historical error data; and controlling the vehicle relative to an object in an environment based at least in part on the buffer region.

R: The method of paragraph Q, wherein determining the buffer region comprises: inputting the one or more of the current state of the vehicle, the error, a distance along a current trajectory of the vehicle, or historical error data into a model; and receiving, from the model, the buffer region.

S: The method of paragraph Q or R, wherein determining the buffer region comprises: determining, based at least in part on tracking error data, a maximum observed tracking error; and scaling the position error or the heading error based at least in part on the tracking error data and a distance along a current trajectory of the vehicle.

T: The method of any of paragraphs Q-S, further comprising: dynamically adjusting the buffer region around the representation of the vehicle based at least in part on tracking error data and a distance along a trajectory of the vehicle. While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving tracking error data associated with a vehicle in an environment, the tracking error data comprising a difference between a prior predicted vehicle state and a measured vehicle state associated with the prior predicted vehicle state;
      receiving current vehicle state data indicating a current state of the vehicle in the environment;
      inputting, into a model, the current vehicle state data and the tracking error data;
      receiving, from the model, one or more of a lateral error associated with a future predicted vehicle state or a heading error associated with the future predicted vehicle state;
      determining a distance along a current trajectory of the vehicle;
      determining, based at least in part on the one or more of the lateral error, the heading error, or the distance, a buffer region around a representation of the vehicle associated with the future predicted vehicle state;
      determining, based at least in part on the buffer region, an intersection between the vehicle at the future predicted vehicle state and an object in the environment; and
      controlling the vehicle based at least in part on the intersection.

2. The system of claim 1, wherein controlling the vehicle comprises:
   determining, based at least in part on the intersection, a candidate trajectory for the vehicle to follow; and
   controlling the vehicle based at least in part on the candidate trajectory.

3. The system of claim 1, wherein predicting the intersection comprises determining an amount that the buffer region around the representation of the vehicle intersects with a representation of the object.

4. The system of claim 1, wherein:
   the current vehicle state data comprises steering rate data or steering angle data, and
   determining the buffer region is further based at least in part on the steering rate data or the steering angle data.

5. The system of claim 1, wherein determining the buffer region comprises:
   determining, based at least in part on the tracking error data, a maximum observed tracking error; and
   scaling the lateral error or the heading error based at least in part on the tracking error data and the distance along the current trajectory of the vehicle.

6. One or more non-transitory computer-readable media storing instructions executable by one or more processors, wherein the instructions, when executed, cause the one or more processors to perform operations comprising:
   determining an error representing a difference between a predicted state of a vehicle and a current state of the vehicle associated with the predicted state, the error comprising one or more of a heading error or a position error;

determining a buffer region around a representation of the vehicle based at least in part on the error and historical error data; and controlling the vehicle relative to an object in an environment based at least in part on the buffer region.

7. The one or more non-transitory computer-readable media of claim 6, wherein determining the buffer region comprises:

inputting the one or more of the current state of the vehicle, the error, a distance along a trajectory of the vehicle, or historical error data into a model; and receiving, from the model, the buffer region.

8. The one or more non-transitory computer-readable media of claim 6, wherein determining the buffer region comprises:

determining, based at least in part on tracking error data, a maximum observed tracking error; and scaling the position error or the heading error based at least in part on the tracking error data and a distance along a current trajectory of the vehicle.

9. The one or more non-transitory computer-readable media of claim 6, wherein controlling the vehicle relative to the object comprises:

predicting, based at least in part on the buffer region, an intersection between the vehicle and the object; and determining a candidate trajectory for the vehicle to follow based at least in part on the intersection.

10. The one or more non-transitory computer-readable media of claim 6, the operations further comprising:

dynamically adjusting the buffer region around the representation of the vehicle based at least in part on tracking error data and a distance along a trajectory of the vehicle.

11. The one or more non-transitory computer-readable media of claim 6, the operations further comprising:

determining that the buffer region around the representation of the vehicle and a representation of the object overlap;

determining, based at least in part on the overlap, a potential intersection between the vehicle and the object; and updating an instruction to control the vehicle relative to the object in the environment further based at least in part on the overlap.

12. The one or more non-transitory computer-readable media of claim 6, the operations further comprising:

receiving, by a model, steering rate data or steering angle data representing the predicted state of the vehicle, and determining, by the model, the buffer region around the representation of the vehicle further based at least in part on the steering rate data or the steering angle data.

13. The one or more non-transitory computer-readable media of claim 6, wherein the buffer region comprises different size or heading from a size or heading associated with the vehicle.

14. The one or more non-transitory computer-readable media of claim 6, wherein the buffer region around the representation of the vehicle comprises a heading that is different from a predicted heading of the vehicle.

15. The one or more non-transitory computer-readable media of claim 6, wherein the error comprises a first error and the operations further comprising:

determining a second error associated with a previous predicted state of the vehicle;

determining a maximum error based at least in part on the first error and the second error; and determining the buffer region around the representation of the vehicle further based at least in part on the maximum error.

16. The one or more non-transitory computer-readable media of claim 6, wherein the buffer region is a first buffer region, and the operations further comprising:

determining an object type associated with the object in the environment; and determining, based at least in part on the object type, a second buffer region around the representation of the vehicle, wherein controlling the vehicle relative to the object in the environment is further based at least in part on the second buffer region.

17. A method comprising:

determining an error representing a difference between a predicted state of a vehicle and a current state of the vehicle associated with the predicted state, the error comprising one or more of a heading error or a position error;

determining a buffer region around a representation of the vehicle based at least in part on the error and historical error data; and controlling the vehicle relative to an object in an environment based at least in part on the buffer region.

18. The method of claim 17, wherein determining the buffer region comprises:

inputting the one or more of the current state of the vehicle, the error, a distance along a current trajectory of the vehicle, or historical error data into a model; and receiving, from the model, the buffer region.

19. The method of claim 17, wherein determining the buffer region comprises:

determining, based at least in part on tracking error data, a maximum observed tracking error; and scaling the position error or the heading error based at least in part on the tracking error data and a distance along a current trajectory of the vehicle.

20. The method of claim 17, further comprising:

dynamically adjusting the buffer region around the representation of the vehicle based at least in part on tracking error data and a distance along a trajectory of the vehicle.

* * * * *